(12) United States Patent
Spencer

(10) Patent No.: US 9,211,582 B2
(45) Date of Patent: Dec. 15, 2015

(54) CLAMP RING AND METHOD FOR MANUFACTURING A CLAMP RING

(71) Applicant: Haldex Brake Corporation, Kansas City, MO (US)

(72) Inventor: John Spencer, Excelsior Springs, MO (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 14/098,261

(22) Filed: Dec. 5, 2013

(65) Prior Publication Data

US 2014/0086672 A1    Mar. 27, 2014

Related U.S. Application Data

(62) Division of application No. 12/877,179, filed on Sep. 8, 2010, now Pat. No. 8,850,663.

(51) Int. Cl.
*B21D 53/36* (2006.01)
*F16B 4/00* (2006.01)
*B21D 53/16* (2006.01)
*B21K 1/16* (2006.01)
(Continued)

(52) U.S. Cl.
CPC ............... *B21D 53/36* (2013.01); *B21D 53/16* (2013.01); *B21K 1/16* (2013.01); *B60T 17/088* (2013.01); *F16B 4/00* (2013.01); *F16D 65/00* (2013.01); *Y10T 24/1457* (2015.01); *Y10T 29/4998* (2015.01); *Y10T 29/49826* (2015.01); *Y10T 403/4933* (2015.01); *Y10T 403/648* (2015.01)

(58) Field of Classification Search
CPC .......... B21D 53/36; B21D 53/16; F16B 4/00; B60T 17/088; F16D 65/00; B21K 1/16; Y10T 24/1457; Y10T 29/4998; Y10T 29/49826; Y10T 403/4933; Y10T 403/648
USPC ........ 29/428, 527.1, 426.5, 439, 505, 525.13, 29/525.14; 24/20 R, 22, 23 R, 23 EE; 403/338, 373; 92/98 R; 72/379.2, 369, 72/371, 365.2, 76; 285/382, 254, 256, 285/407.416; 220/319, 242, 213, 309.1
See application file for complete search history.

(56) References Cited

U.S. PATENT DOCUMENTS 1,664,553 A    10/1927  Trout
1,745,345 A *   2/1930  Anderson ................... 92/130 R
(Continued)

FOREIGN PATENT DOCUMENTS

CA          2319576 A1    8/1999
CH           359578 A     1/1962
(Continued)

OTHER PUBLICATIONS

European Search Report; Application No. EP 11 18 0198; Issued: Jan. 24, 2012; 5 pages.

*Primary Examiner* — John C Hong
(74) *Attorney, Agent, or Firm* — St. Onge Steward Johnston & Reens LLC

(57) ABSTRACT

A clamp ring and process for manufacturing a clamp ring to effectively reduce, if not eliminate, waste scrap from the manufacturing process. The clamp ring and process for manufacturing the same, results in clamp ring having a seam formed by a metal joining technique such as welding, brazing, bolting, soldering, and clinching.

20 Claims, 3 Drawing Sheets

(51) Int. Cl.
*B60T 17/08* (2006.01)
*F16D 65/00* (2006.01)

(56) References Cited

U.S. PATENT DOCUMENTS

| | | | |
|---|---|---|---|
| 2,074,231 | A | 3/1937 | Meacham |
| 3,020,631 | A | 2/1962 | Kennedy |
| 3,142,433 | A | 7/1964 | Balocca |
| 3,765,707 | A | 10/1973 | Westberg |
| 4,106,799 | A | 8/1978 | Oetiker |
| 4,109,350 | A | 8/1978 | Acre |
| 4,397,414 | A | 8/1983 | Baldwin |
| 4,451,955 | A | 6/1984 | Kern et al. |
| 5,001,816 | A | 3/1991 | Oetiker |
| 5,185,908 | A | 2/1993 | Oetiker |
| 5,193,432 | A | 3/1993 | Smith |
| 5,311,809 | A | 5/1994 | Choinski et al. |
| 5,433,138 | A | 7/1995 | Choinski et al. |
| 5,768,752 | A | 6/1998 | Oetiker |
| 5,775,202 | A | 7/1998 | Plantan et al. |
| 6,421,886 | B1 | 7/2002 | Oetiker |
| 6,481,061 | B1 | 11/2002 | Andre et al. |
| 6,526,867 | B2 | 3/2003 | Anderson |
| 2002/0144593 | A1 | 10/2002 | Pisoni et al. |
| 2004/0041007 | A1 | 3/2004 | Cremerius |
| 2007/0028427 | A1 | 2/2007 | Albini et al. |

FOREIGN PATENT DOCUMENTS

| | | |
|---|---|---|
| DE | 2736149 A1 | 2/1979 |
| EP | 0972588 A2 | 1/2000 |
| FR | 2645220 A1 | 10/1990 |
| FR | 2664347 A1 | 1/1992 |
| GB | 1589038 A | 5/1981 |
| GB | 2232193 A | 12/1990 |
| GB | 2247041 A | 2/1992 |
| GB | 2451114 A | 1/2009 |
| JP | 2292506 A | 12/1990 |
| JP | 4249605 A | 9/1992 |
| JP | H08300081 A | 11/1996 |
| JP | 2002502013 A | 1/2002 |
| JP | 2004202499 A | 7/2004 |
| WO | 9939123 A1 | 8/1999 |

* cited by examiner

FIG. 9  FIG. 9A
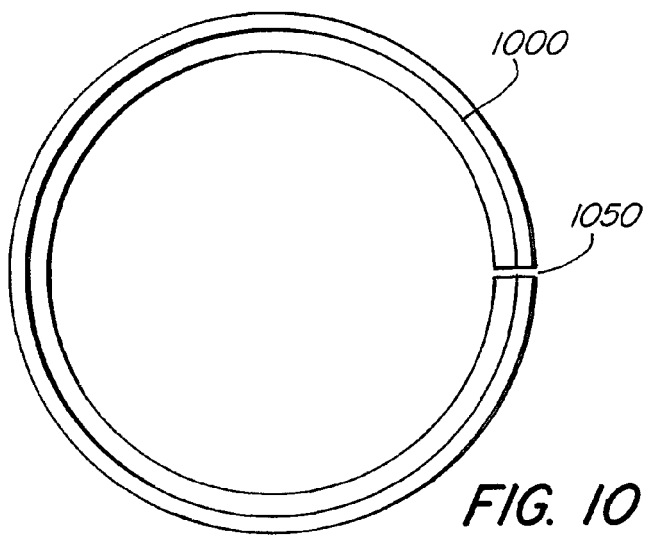
FIG. 10
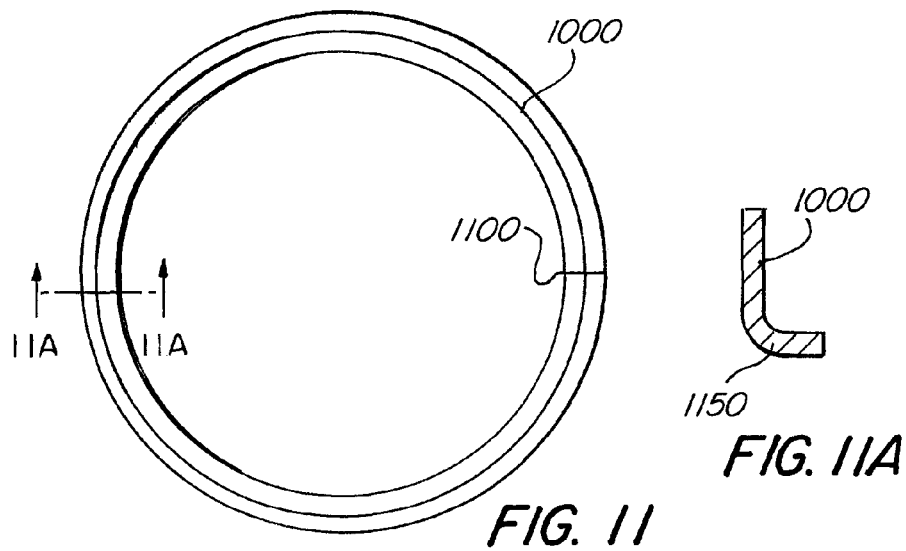
FIG. 11  FIG. 11A

CLAMP RING AND METHOD FOR MANUFACTURING A CLAMP RING

FIELD OF THE INVENTION

The invention relates to a process for manufacturing a clamp ring to effectively reduce, if not eliminate, waste scrap from the manufacturing process. The process results in the formation of a clamp ring having a seam formed by a metal joining technique.

BACKGROUND OF THE INVENTION

Clamp rings are used in brake actuator products and are typically made from sheet steel or other types of metal. Clamp rings may be used to contact and to hold the brake actuator housing parts together to keep pressure within the actuator housing. Clamp rings may also be used to reduce the lateral movement of the piston member and may be used to seal the actuator housing during operation of a brake actuator.

For clamp rings made of sheet steel, in the prior art, the steel is typically cut into strips of a width necessary to provide enough material to blank a round piece ranging from roughly six (6) inches in diameter to roughly ten (10) inches in diameter.

In prior art manufacturing processes, the following steps are provided. Step 1 involves a sheet steel of the correct thickness being provided. In step 2, blank round circles are formed in the steel sheet and anything outside of the circles is scrap which is thrown out and discarded. Step 3 involves drawing the circles into a basic shape and step 4 involves blanking out the center of the circles to form the ring, whereby the center of the circle is thrown away as scrap.

The prior art manufacturing process is shown in FIGS. 1-4. FIG. 1 shows steel sheet 100 of the correct thickness being provided. FIG. 2 shows blank round circles 205, 210, 215, 220 and 225 in the steel sheet 100. The blank is made as the steel around the circular ring is first scrapped blank.

FIG. 3 shows the step of drawing circles 300 to a basic shape and FIG. 4 shows the center 400 of the circle 300 blanked out. The center 400 is then scrapped and the clamp ring is formed.

The circular ring may also be passed through additional draw operations during this process. Such a process, however, is inefficient and wasteful as over 70% of the steel sheet is thrown away as scrap. Additionally, the end product clamp ring is generally weak as its side walls have been stretched during the manufacturing process. This is because the drawing process also reduces the thickness in the center of the vertical side of the ring due to the stretching inherent with the drawing process, and this results in clamp rings that have decreased tensile strength. Clamp rings that have decreased tensile strength have a shorter lifespan and are more likely to fail than clamp rings that do not undergo stretching or any other such tension or stress during the manufacturing process. In the prior art, a typical part as currently produced has a 15-20% sidewall thinning due to the drawing process from the base steel thickness.

Furthermore, the prior art process is inefficient as the cost of the clamp ring part includes the cost for the entire steel sheet including the scrap, which is removed. It is a huge waste of cost of materials to throw away the remainder of the steel sheet, while only a small portion of the sheet is used to form the clamp ring.

Clamp rings have been used on actuator products for years, and prior art attempts have been made to reduce the cost several times, however, each time a large percentage of scrap was required to make each part.

U.S. Pat. No. 6,526,867 (Anderson) teaches an annular retaining member formed by metal that can be made of either one or two pieces. However, the '867 patent teaches attaching the halves by a hinge, rather than by welding. The '867 patent further does not teach a process for manufacturing a clamp ring and does not mention the benefits of establishing a manufacturing process that eliminates and reduces waste scrap.

U.S. Pat. No. 5,775,202 (Plantan et al.) teaches a deformed clamp band made from a continuous roll. However, the '202 patent does not teach the process of welding the ends together. Furthermore, this patent does not teach a process for manufacturing a clamp ring and does not mention the benefits of establishing a manufacturing process that eliminates and reduces waste scrap.

U.S. Pat. No. 5,433,138 (Choinski et al.) and U.S. Pat. No. 5,311,809 (Choinski et al.) teach a retaining member comprising a ring of metal, but do not teach a process for manufacturing a clamp ring and do not mention the benefits of establishing a manufacturing process that eliminates and reduces waste scrap.

Similarly, U.S. Pat. No. 5,193,432 (Smith) teaches that one end of an annular retaining member can be butt welded to the other end. However, the '432 patent does not mention the benefits of this process for eliminating and reducing waste scrap. United States Patent Application No. 2004/0041007 (Cremerius) teaches a method of producing a strip portion, bending the strip portion to form a cylindrical ring with abutting strip ends and welding the strip ends so that they form a clamped ring. However, the '007 application does not mention the benefits of this process for eliminating and reducing waste scrap. Furthermore, both these patents do not teach a process for manufacturing a clamp ring and do not mention the benefits of establishing a manufacturing process that eliminates and reduces waste scrap.

As none of the prior art teaches a method and process for manufacturing a clamp ring that that eliminates and reduces waste scrap, it is desirable to provide such a method and process.

It is further desirable to provide a method and process for manufacturing a clamp ring without being inefficient and wasteful and without throwing out over 70% of the steel sheet as scrap material.

It is further desirable to provide a clamp ring that has an increased tensile strength because it does not undergo stretching the sidewall of the ring during manufacturing. It is further desirable to provide a clamp ring that has a seam formed by the metal joining technique.

SUMMARY OF THE INVENTION

Accordingly, it is an object of the present invention to provide a method and process for manufacturing a clamp ring that that eliminates and reduces waste scrap, including over 70% of the waste scrap.

It is another object of the present invention to provide a clamp ring that has an increased effective strength because it does not undergo stretching of the sidewall of the ring during manufacturing.

It is another object of the present invention to provide an alternative process to prior art processes for manufacturing a clamping ring.

It is another object of the present invention to provide a clamp ring with an increased thickness in the center of the vertical side of the ring due to lack of stretching due to prior art drawing processes.

It is another object of the present invention to provide a clamp ring that has a seam formed by the metal joining technique.

It is another object of the present invention to overcome prior attempts to reduce the cost of manufacturing a clamp ring. Prior attempts have been made to reduce the cost several times, however, each time a large percentage of scrap was required to make each part. There has been a long-felt need in the industry to make clamp rings having a reduced cost without having a large percentage of scrap required to make each part.

These and other objectives are achieved by providing a method for manufacturing a clamp ring comprising the steps of: providing a strip of metal; cutting the strip into a rectangular shape; shaping the strip into a circle via a shaping technique; and attaching two ends of the strip via a metal joining technique to form the clamp ring.

The metal joining technique may be selected from a group consisting of welding, brazing, bolting, soldering, or clinching.

The shaping technique may be selected from a group that consists of coiling, rolling, hammering, stretching, planishing, bending, shearing, stamping, or raising.

The step of cutting the strip into a rectangular shape may be selected from a group consisting of shearing, die cutting, turning, milling, drilling, grinding, or sawing.

The method may further comprise a step of bending the bottom of the ring to form an arc'd or curved area. The arc'd or curved area may be formed by using a shaping technique.

The clamp ring may be tamper proof. The strip of material may be in the shape of a square. The clamp ring may also have a diameter ranging from six inches to nine inches.

The method may further comprise the step of testing the clamp ring to meet the functional product safety requirement of being taper proof.

The clamp ring may further have a seam formed by the metal joining technique.

The strip of metal may also be selected from a group consisting of steel, aluminum, iron, gold, silver, copper, lead, tin, or a metal alloy.

Other objectives of the invention are achieved by providing a clamp ring comprising: a strip of metal shaped in a circle, wherein the strip of seal has a seam formed by a metal joining technique, and wherein the strip of metal was formed by a cutting technique.

The clamp ring may have its strip of metal shaped via a shaping technique. The shaping technique may be selected from a group that consists of coiling, rolling, hammering, stretching, planishing, bending, shearing, stamping, or raising. The metal joining technique may be selected from a group consisting of welding, brazing, bolting, soldering, or clinching.

The clamp ring may have a diameter ranging from six inches to ten inches. The bottom of the clamp ring may bend to form an arc'd or curved area. This arc'd or curved area may be formed by using a shaping technique.

The clamp ring may be tamper proof. The cutting technique to form the shaped material may be selected from a group consisting of shearing, die cutting, turning, milling, drilling, grinding, or sawing.

The strip of metal forming the clamp ring may be selected from a group consisting of steel, aluminum, iron, gold, silver, copper, lead, tin, or a metal alloy.

Other objectives of the invention are achieved by providing a clamp ring made by a process comprising the steps of: providing a strip of metal; cutting the strip into a rectangular shape; shaping the strip into a circle via a shaping technique; and attaching two ends of the strip via a metal joining technique to form the clamp ring, wherein the clamp ring has a seam formed by the metal joining technique.

The metal joining technique of the clamp ring may be selected from a group consisting of welding, brazing, bolting, soldering, and clinching. The shaping technique of the clamp ring may be selected from a group that consists of coiling, rolling, hammering, stretching, planishing, bending, shearing, stamping, or raising. The clamp ring may also have a diameter ranging from six inches to nine inches.

Other objectives of the invention are achieved by providing a process that teaches the manufacturing of a clamp ring that consists of slitting a steel coil to the right width and length, using coiling, rolling and/or any steel forming technique to shape the strip into a circle, and then attaching two ends together using steel joining techniques such as welding, whereby the bottom ends form the arched area and may be formed either before or after the end joining process by again using steel coiling, rolling, and forming techniques, and further requiring that the final product after assembly has to meet functional product safety requirements and where the process effectively eliminates wasted scrap.

The scrap may be effectively eliminated under the present invention, and the effective strength of the product is increased by eliminating the stretching the sidewall of the ring. The process may further involve slitting a steel coil to the right width and length, using coiling, rolling and/or any other steel forming technique to shape the strip into a circle, and then attaching two ends together using steel joining techniques. The bottom bends to form the arc'd or curved area and may be formed either before or after the end joining process by again using steel coiling, rolling, and forming techniques.

The requirements for the finished assembly are to duplicate the shape of the drawn ring, and the final product after assembly has to meet the functional product safety requirement of being as tamper proof as the rolled drawn product of the prior art.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 9 shows a side view of a steel sheet of the present invention;

FIG. 9A shows an end view of the steel sheet of FIG. 9;

FIG. 10 shows a clamp ring of the present invention formed from the steel sheet of FIG. 9;

FIG. 11 shows the clamp ring of FIG. 10 having a seam;

FIG. 11A shows a cross section view of the arc'd or curved area of the clamp ring of FIG. 11.

DETAILED DESCRIPTION OF THE INVENTION

Figure 1:
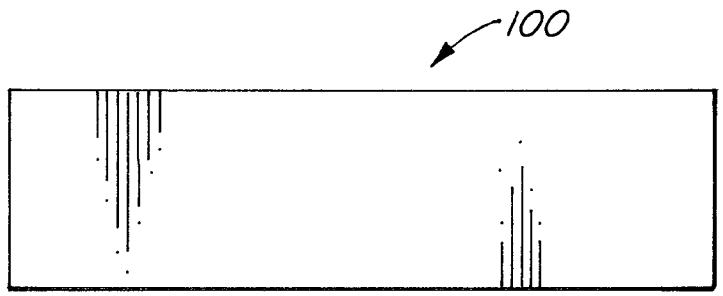
FIG. 1 is a top view of a steel sheet of the prior art.
Figure 1A:
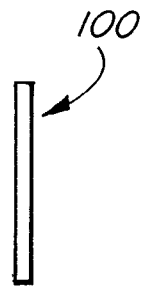
FIG. 1A is an end view of the sheet shown in FIG. 1.
Figure 2:
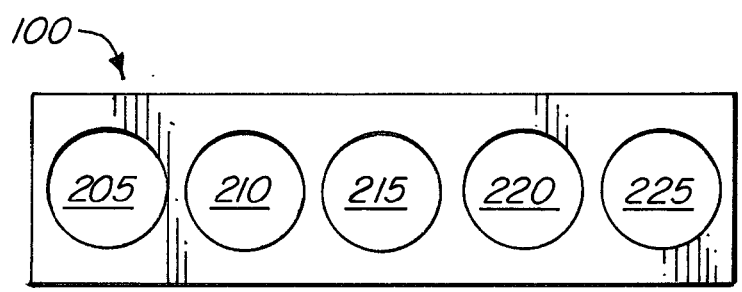
FIG. 2 is shows blank round circles being formed in the sheet of FIG. 1.
Figure 3:
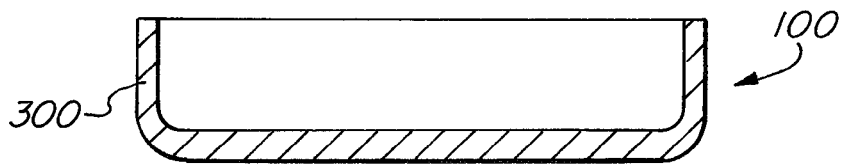
FIG. 3 shows the step of drawing circles in the sheet of FIG. 1.
Figure 4:
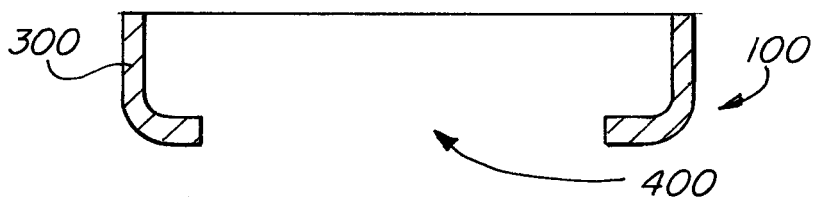
FIG. 4 shows the step of blanking out the center of the circles in FIG. 3.
Figure 5:
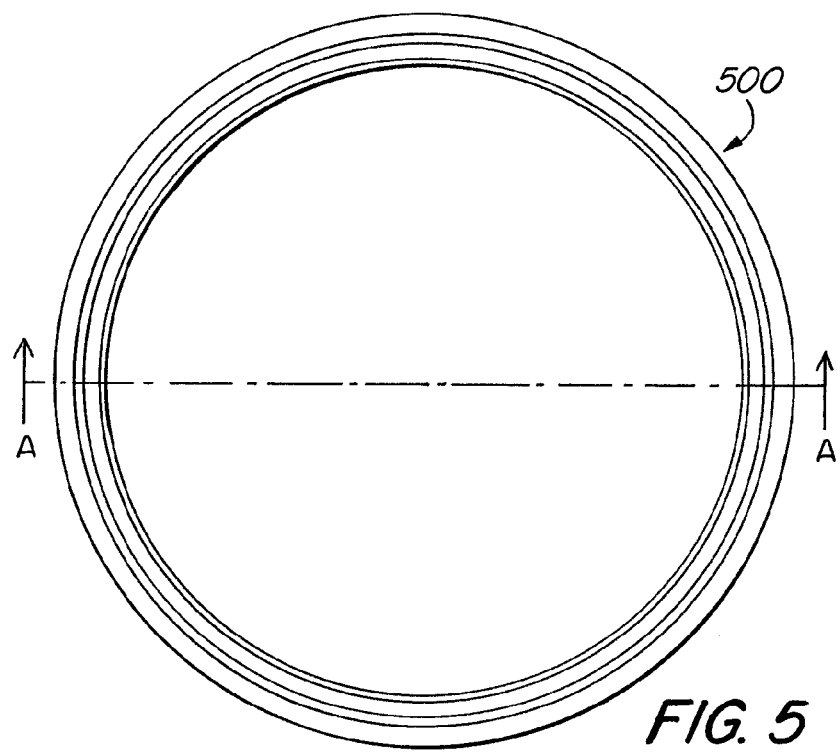
FIG. 5 shows a top view of a clamp ring of the present invention.

Referring to FIG. 5, clamp ring 500 of the present invention is shown. Clamp ring 500 is shown having ridges, however such ridges are not required in all embodiments of the present invention.

Figure 6:
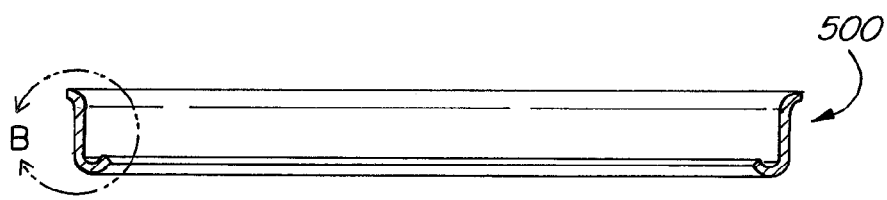
FIG. 6 shows a cross-section view of the clamp ring of the FIG. 5 having an arc'd or curved area.
Figure 7:
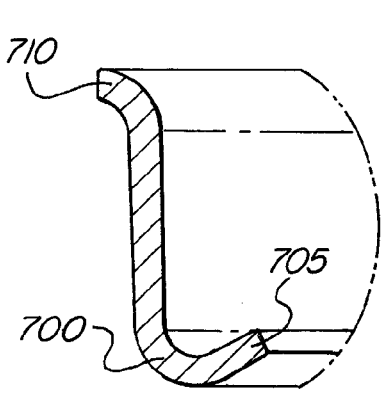
FIG. 7 shows a close up detailed view of the arc'd or curved area of FIG. 6.

FIG. 6 shows a cross section view of clamp ring 500 of FIG. 5 taken along line A-A. Here the arc'd area of the clamp ring is shown taken across section B of FIG. 6. FIG. 7 shows a close up detailed view of the arc'd or curved area of FIG. 6. Arc'd section 700 is shown in FIG. 7 having a top section 710 and a bottom section 705. Arc'd section 700 is used to help the clamp ring form a seal. Arc'd section 700, top section 710 and bottom section 705 may have various angles to conform the clamp ring 500 to the member it attaches to.

Figure 8:
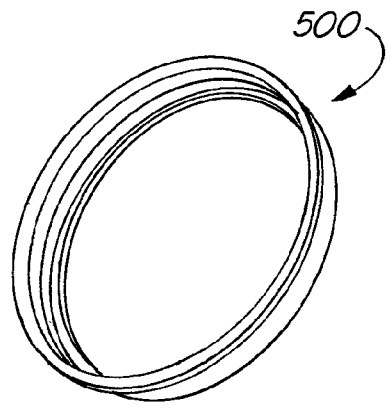
FIG. 8 shows a perspective view of the clamp ring of FIG. 5.

FIG. 8 shows a perspective view of clamp ring 500 of the present invention.

FIG. 9 shows a side view of steel sheet 900 of the present invention and FIG. 9A shows an end view of steel sheet 900 of FIG. 9. Steel sheet 900 is shaped by a shaping technique is selected from a group that consists of coiling, rolling, hammering, stretching, planishing, bending, shearing, stamping, or raising.

After being shaped, the steel sheet 900 is shaped into the clamp ring 1000 shown in FIG. 10. FIG. 10. Clamp ring 1000 has a space 1050 formed between its two ends.

As shown in FIG. 11, the space 1050 is filled by a seam 1100. Seam 1100 may be formed by a metal joining technique selected from a group consisting of welding, brazing, bolting, soldering, or clinching.

FIG. 11A shows a cross section view of the clamp ring 1000 having an arc'd or curved section 1150. FIG. 11A is a cross section view taken across line 11A-11A of FIG. 11.

The invention may involve using metal joining techniques such as welding, brazing, bolting, soldering, or clinching.

The invention may involve using welding techniques such as arc-welding, shielded metal arc welding (SMAW), plasma arc welding, and other such welding techniques known in the art.

The invention may involve shaping techniques such as coiling, rolling, hammering, stretching, planishing, bending, shearing, stamping, or raising.

The invention may also involve coil slitting equipment and techniques and coilers and joining equipment.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A method for manufacturing a clamp ring comprising the steps of:
    providing a strip of metal;
    cutting the strip into a rectangular shape;
    shaping the strip into a circle via a shaping technique;
    attaching two ends of the strip via a metal joining technique to form the clamp ring having a seam between the two ends formed by the metal joining technique; and
    bending the clamp ring after formation of the seam, the clamp ring having a top section and a bottom section, the top section having a radially outward bend terminating with an outwardly facing distal surface, and the bottom section having a radially inward bend terminating with an inwardly facing distal surface.

2. The method of claim 1, wherein the metal joining technique is selected from a group consisting of welding, brazing, bolting, soldering, or clinching.

3. The method of claim 1, wherein the shaping technique is selected from a group that consists of coiling, rolling, hammering, stretching, planishing, bending, shearing, stamping, or raising.

4. The method of claim 1, wherein the step of cutting the strip into a rectangular shape is selected from a group consisting of shearing, die cutting, turning, milling, drilling, grinding, or sawing.

5. The method of claim 1, wherein the arc'd area is formed by using a shaping technique.

6. The method of claim 1, wherein the clamp ring is tamper proof.

7. The method of claim 1, wherein the rectangular shape is a square.

8. The method of claim 1, wherein the clamp ring has a diameter ranging from six inches to nine inches.

9. The method of claim 1, further comprising the step of testing the clamp ring to meet the functional product safety requirement of being tamper proof.

10. The method of claim 1, wherein the clamp ring has a seam formed by the metal joining technique.

11. The method of claim 1, wherein the strip of metal is selected from a group consisting of steel, aluminum, iron, gold, silver, copper, lead, tin, or a metal alloy.

12. A clamp ring made by a process comprising the steps of:
    providing a strip of metal;
    cutting the strip into a rectangular shape;
    shaping the strip into a circle via a shaping technique;
    attaching two ends of the strip via a metal joining technique to form the clamp ring, the clamp ring having a seam formed by the metal joining technique; and
    bending the clamp ring, the clamp ring having a top section and a bottom section, the top section having a radially outward bend terminating with an outwardly facing distal surface, and the bottom section having a radially inward bend terminating with an inwardly facing distal surface.

13. The clamp ring of claim 12, wherein the metal joining technique is selected from a group consisting of welding, brazing, bolting, soldering, or clinching.

14. The clamp ring of claim 12, wherein the shaping technique is selected from a group that consists of coiling, rolling, hammering, stretching, planishing, bending, shearing, stamping, or raising.

15. The clamp ring of claim 12, wherein the clamp ring has a diameter ranging from six inches to nine inches.

16. A brake actuator having the clamp ring of claim 12, the clamp ring attached around the brake actuator holding housing parts of the brake actuator together.

17. A method of manufacturing a clamp ring comprising:
    slitting a steel coil into a strip;
    using coiling, rolling and/or any steel forming technique to shape the strip into a circle;

attaching two ends together using a steel joining technique to form the clamp ring, the clamp ring having a seam formed by the steel joining technique, a top section, and a bottom section; and bending the clamp ring such that the top section has a radially outward bend terminating with an outwardly facing distal surface and the bottom section has a radially inward bend terminating with an inwardly facing distal surface.

18. The method of claim 17, wherein the steel joining technique is selected from a group consisting of welding, brazing, bolting, soldering, or clinching.

19. The method of claim 17, wherein the arc'd area is formed after the joining process by using at least one of steel coiling, rolling, and forming techniques.

20. The method of claim 17, wherein the clamp ring is tamper proof.

* * * * *